(12) United States Patent
Chatroux et al.

(10) Patent No.: US 10,530,022 B2
(45) Date of Patent: Jan. 7, 2020

(54) ELECTRIC BATTERY COMPRISING A SYSTEM FOR HOMOGENIZING ITS INTERNAL TEMPERATURE

(71) Applicant: Commissariat à l'Energie Atomique et aux Energies Alternatives, Paris (FR)

(72) Inventors: Daniel Chatroux, Teche (FR); Julien Dauchy, Chambery (FR); Lionel De Paoli, Odenas (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 95 days.

(21) Appl. No.: 15/339,627

(22) Filed: Oct. 31, 2016

(65) Prior Publication Data

US 2017/0125860 A1    May 4, 2017

(30) Foreign Application Priority Data

Nov. 4, 2015 (FR) .................................. 15 60543

(51) Int. Cl.
*H01M 10/63* (2014.01)
*H01M 10/617* (2014.01)
*H01M 10/6567* (2014.01)
*H01M 10/48* (2006.01)

(52) U.S. Cl.
CPC ........... *H01M 10/63* (2015.04); *H01M 10/48* (2013.01); *H01M 10/617* (2015.04); *H01M 10/6567* (2015.04)

(58) Field of Classification Search
CPC .... H01M 10/48; H01M 10/617; H01M 10/63; H01M 10/6567
See application file for complete search history.

(56) References Cited

U.S. PATENT DOCUMENTS

| 2010/0099015 | A1 | 4/2010 | Kawai |
| 2010/0178554 | A1 | 7/2010 | Hama |
| 2012/0183830 | A1 | 7/2012 | Schaefer et al. |
| 2013/0209838 | A1* | 8/2013 | Manna ............... H01M 10/6551 429/7 |

(Continued)

FOREIGN PATENT DOCUMENTS

| JP | 2006331956 A | 12/2006 |
| WO | 2014158857 A1 | 10/2014 |

(Continued)

OTHER PUBLICATIONS

Preliminary Search Report in French Patent Application No. 1560543, dated Jan. 18, 2016, 2016, 2 pages.

*Primary Examiner* — Miriam Stagg
*Assistant Examiner* — Victoria H Lynch
(74) *Attorney, Agent, or Firm* — Moreno IP Law LLC

(57) ABSTRACT

An electric battery including: a plurality of electrical energy storage cells, each including a positive terminal and a negative terminal, the cells being arranged in a package containing a dielectric liquid; within the package, a controllable stirring device for circulating the dielectric liquid in contact with the positive and negative terminals of the cells; and a management device capable of detecting a possible failure of a cell and of accordingly controlling the stirring device to modify the dielectric liquid circulation conditions in the package.

11 Claims, 3 Drawing Sheets

(56) References Cited

U.S. PATENT DOCUMENTS

| | | |
|---|---|---|
| 2013/0260195 A1 | 10/2013 | Long |
| 2014/0318746 A1 | 10/2014 | Kwak et al. |
| 2014/0356660 A1 | 12/2014 | Inoue |
| 2015/0380782 A1* | 12/2015 | Youngs ............... H01M 10/625 429/72 |

FOREIGN PATENT DOCUMENTS

| | | |
|---|---|---|
| WO | 2014184419 A1 | 11/2014 |
| WO | 2015035406 A1 | 3/2015 |

* cited by examiner

10,530,022 B2

ELECTRIC BATTERY COMPRISING A SYSTEM FOR HOMOGENIZING ITS INTERNAL TEMPERATURE

CROSS-REFERENCE TO RELATED APPLICATION

This application claims the priority benefit of French patent application number 15/60543, the content of which is hereby incorporated by reference in its entirety to the maximum extent allowable by law.

BACKGROUND

The present disclosure relates to the field of electric batteries, and more particularly aims at an electric battery comprising a system for homogenizing its internal temperature.

DISCUSSION OF THE RELATED ART

An electric battery conventionally comprises a plurality of rechargeable electrical energy storage cells connected in series and/or in parallel between a positive terminal and a negative battery voltage supply terminal. The cells are generally arranged in a protection package leaving access to the positive terminal and to the negative terminal of the battery.

The elementary cells are conventionally electrochemical cells or accumulators. The cells generally tend to naturally heat up during battery recharge or discharge phases. To avoid their degradation, the cells should however be kept in specific temperature ranges depending, in particular, on their operating mode (recharge, discharge, idle, etc.) and on the type of considered cell. Above a given temperature, exothermal chemical reactions start within the cell. The cell is then no longer capable of sufficiently rapidly discharging the heat that it generates, which causes an increase of its internal temperature and results in an additional increase of the quantity of heat generated within the cell. The cell is said to start a thermal runaway, which may very rapidly cause its destruction and cause serious damage to the battery.

To limit risks of thermal runaway, various solutions have been provided. It has in particular been provided to space the cells apart from one another within the protection package to enable a better discharge of the heat generated by the cells. This spacing is also conventionally used to limit the heating of the cells located in the vicinity of a cell which starts a thermal runaway to avoid the propagation of the defect from close to close. It has further been provided to include in the package a ventilation device, generally in open circuit, to better discharge the heat generated by the cells. It has further been provided to include in the package a cooling circuit capable of circulating a heat-carrying liquid close to the cells, for example, water or oil, the liquid being cooled outside of the package in a heat exchanger coupled to a cold source.

Existing systems however have various disadvantages. In particular, a disadvantage is that their ability to discharge the heat generated by a cell remains relatively limited. Thus, existing systems enable to maintain the cells within their temperature range specified by the constructor, which enables to prevent risks of thermal runaway when the battery operates in normal conditions, but they do not enable to stop a thermal runaway of a cell caused, for example, by a failure such as a shorting or an overcharge of the cell. To be able to stop a thermal runaway, existing system should be oversized, which would in particular pose problems of bulk, weight, electric power consumption, etc.

SUMMARY

Thus, an embodiment provides an electric battery comprising: a plurality of electrical energy storage cells, each comprising a positive terminal and a negative terminal, the cells being arranged in a package containing a dielectric liquid; within the package, a controllable stirring device for circulating the dielectric liquid in contact with the positive and negative terminals of the cells; and a management device capable of detecting a possible failure of a cell and of accordingly controlling the stirring device to modify the dielectric liquid circulation conditions in the package.

According to an embodiment, the cells are totally immersed in the dielectric liquid.

According to an embodiment, the stirring device comprises a propeller immersed in the dielectric liquid, coupled to a driving motor.

According to an embodiment, the cells are not totally immersed in the dielectric liquid.

According to an embodiment, the stirring device is capable of sucking the dielectric liquid into a lower portion of the package, and of spraying the sucked-in liquid onto the cells.

According to an embodiment, the stirring device is not coupled to a heat exchanger external to the package.

According to an embodiment, the battery further comprises a cooling circuit comprising a heat exchanger located outside of the package.

According to an embodiment, the cooling circuit comprises a pump separate from the stirring device capable of circulating the dielectric liquid in the heat exchanger.

According to an embodiment, the dielectric liquid is a dielectric oil or a dielectric ester.

According to an embodiment, the battery further comprises a device for maintaining the internal pressure of the package at a value substantially equal to the outer pressure.

According to an embodiment, the battery further comprises a controllable device for heating the dielectric liquid.

The foregoing and other features and advantages will be discussed in detail in the following non-limiting description of specific embodiments in connection with the accompanying drawings.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
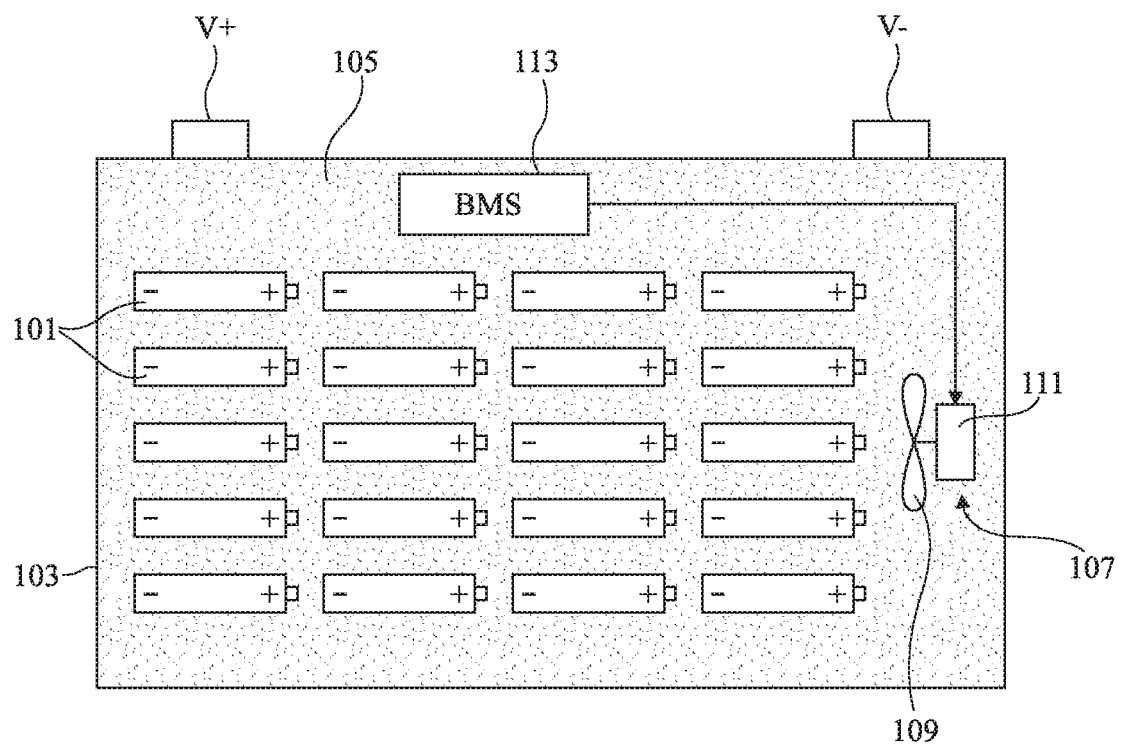
FIG. 1 is a simplified cross-section view of an embodiment of an electric battery.

The same elements have been designated with the same reference numerals in the different drawings and, further, the various drawings are not to scale. For clarity, only those elements which are useful to the understanding of the described embodiments have been shown and are detailed. In particular, the interconnection diagrams of the elementary cells of a battery have not been detailed, the described embodiments being compatible with all or most usual battery cell interconnection diagrams. In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings or to a battery in a normal position of use. Unless otherwise specified, expressions "approximately", "substantially", and "in the order of" mean to within 10%, preferably to within 5%.

An elementary cell of an electric battery typically comprises a positive electrode and a negative electrode separated by an electrolyte. The positive electrode is electrically and mechanically connected to a positive connection terminal of the cell and the negative electrode is electrically and mechanically connected to a negative connection terminal of the cell. The cell for example has a generally cylindrical or parallelepipedal shape. The positive and negative connection terminals of the cell may be arranged on opposite surfaces of the cell or on a same surface of the cell. In practice, it can be observed that, in operation, the connection terminals of a cell have a slightly higher temperature than the rest of the cell. This is due, in particular, to the fact that the positive and negative electrodes generally have a better heat conductivity than the rest of the cell. Thus, the heat generated within the cell is guided in privileged fashion towards the connection terminals by the positive and negative electrodes of the cell.

In existing batteries comprising cooling systems using a heat-carrying liquid such as water or oil, the cell connection terminals are not directly in contact with the cooling liquid, which limits the ability of the system to discharge the heat generated in the cells. In the case of an electrically-conductive heat-carrying liquid such as water, the liquid is even totally isolated from the cells by tight walls and at least one electric isolation which, here again, limits the ability of the system to discharge the heat generated in the cells.

Another disadvantage of existing systems is that after having circulated close to the cells within the protection package, the cooling liquid is conducted into a heat exchanger located outside of the package. This results in relatively high head losses and accordingly in a relatively low displacement speed of the cooling liquid within the package. Here again, this limits the ability of the system to discharge the heat generated in the cells.

In batteries comprising air cooling systems, the cell connection terminals may be in direct contact with the air circulating through the cooling system. Further, the circulation speed of the air in contact with the cells may be relatively high. However, since the coefficient of heat transfer between the cells and the air is relatively low, the ability of the system to discharge the heat generated in the cells remains limited.

FIG. 1 is a cross-section view schematically illustrating an example of an electric battery according to a first embodiment.

The battery of FIG. 1 comprises a plurality of elementary rechargeable electrical energy storage cells 101. Each cell comprises a positive connection terminal (+) and a negative connection terminal (−). Cells 101 are connected in series and/or in parallel between a positive terminal V+ and a negative terminal V− of the battery. For simplification, the elements of interconnection between cells 101 of the battery have not been shown. Each cell 101 for example has a generally parallelepipedal or cylindrical shape. More generally, cells 101 may have any other shape. Cells 101 are arranged within a protection package 103 of the battery, for example, of generally parallelepipedal shape, leaving access to positive terminal V+ and negative terminal V− of the battery.

In the embodiment of FIG. 1, package 103 is filled with a dielectric liquid 105, for example, a dielectric oil or a dielectric ester, so that each cell 101 of the battery is totally immersed in liquid 105. In particular, in the example of FIG. 1, the positive and negative terminals of cells 101 are immersed in liquid 105. It should be noted that the fact that liquid 105 is dielectric enables to immerse the positive and negative terminals of cells 101 without risking creating short-circuits within the battery. Dielectric here means that liquid 105 has an electric conductivity at 300 K smaller than $10^{-4}$ S/m. Preferably, the arrangement of cells 101 within package 103 is such that free spaces communicating with one another are located between neighboring cells of the battery. The distance between neighboring cells 101 of the battery may however be very small, for example, smaller than one tenth of the width of a cell. In the case of cylindrical cells having a circular cross-section, the cells may for example be arranged in quincunx in a plurality of layers, so that the neighboring cells of a same layer touch one another, and that the neighboring cells of neighboring layers touch one another. The contact between cells then enables to bond the cells placed in quincunx to one another at the level of the tangents forming the contact areas. Such a configuration enables to minimize the volume and the mass of the mechanical cell assembly.

The battery of FIG. 1 further comprises, within package 103, immersed in liquid 105, a controllable stirring device 107 capable of stirring liquid 105 within package 103 to homogenize its temperature. In the shown example, device 107 comprises a propeller 109 immersed in liquid 105, driven by an engine 111. When propeller 109 is moving, it generates within package 103 a circulation of liquid 105 in contact with cells 101. As a result, the heat locally generated by each cell is rapidly discharged from the cell and distributed in the entire battery. As a variation, stirring device 107 may comprise a circulation pump immersed in liquid 105, capable of stirring liquid 105 within package 103. Stirring device 107 is for example electrically powered by one or a plurality of cells 101 of the battery. Preferably, stirring device 107 is connected to a plurality of power supply sources drawing their energy from different cells of the battery, to be able to keep on operating in the occurrence of a failure of one or a plurality of cells.

The battery of FIG. 1 further comprises an electronic battery management system 113 (BMS) capable of detecting a possible failure or faulty operation capable of causing a thermal runaway of one or a plurality of battery cells, or of resulting from a thermal runaway of one or a plurality of cells of the battery. To achieve this, management device 113 is for example capable of measuring the voltage across each of the battery cells, and/or of measuring the current flowing through each of the battery cells, and/or of measuring the temperature of one or a plurality of regions of the battery, for example, the temperature of each of the battery cells, and/or of measuring the internal pressure of each of the battery cells. Management device 113 may further comprise a processing circuit, for example, a microcontroller, capable of interpreting the values supplied by its different sensors. The forming of management device 113 will not be detailed hereafter since the described embodiments are compatible with usual architectures and operating modes of electronic battery management devices. Management device 113 may be totally or partially immersed in the dielectric liquid 105 contained in package 103. Management device 113 is further capable of controlling stirring device 107.

In normal operation, stirring device 107 may be turned off. As a variation, device 107 may be controlled to slightly stir liquid 105. For example, device 107 may be controlled to rotate propeller 109 at a relatively low speed. Such a light stirring enables, in particular, to homogenize the temperature of liquid 105 during normal operating phases of the battery, and thus to ease the detection of a possible abnormal temperature rise of a cell, in the case where management device 103 comprises a limited number only of temperature sensors, for example, a number smaller than the number of cells 101 of the battery.

Management device 113 is further configured in order to control, when it detects a thermal runaway or a risk of thermal runaway of one or a plurality of cells 101 of the battery, device 107 in order to increase (with respect to the normal operating mode) the stirring speed of liquid 105 within the package. For example, device 113 may be configured to control an increase in the rotation speed of propeller 109 of stirring device 107 when it detects a faulty operation. As an example, stirring device 107 is controlled to operate at less than 10 percent of its maximum power in normal operation, and to operate at a power in the range from 80 to 100 percent of its maximum power in case of an anomaly. As an illustration, a failure of a cell may conventionally cause the releasing by the cell, within a given time interval, of a quantity of thermal energy from five to ten times greater than the quantity of thermal energy normally released by the cell within an identical time interval in the absence of a failure. Thus, by increasing the liquid stirring power by a factor greater than or equal to 5 and preferably greater than or equal to 10 in case of an anomaly, a thermal runaway of the faulty cell may be avoided or stopped.

Due to the fact that stirring device 107 is located inside of package 103 and that device 107 is not in charge of circulating liquid 105 into a heat exchanger located outside of package 103 confining liquid 105, a particularly fast stirring of liquid 105 may be implemented by device 107 in the occurrence of an anomaly. As an example, in the occurrence of an anomaly, the circulation speed of liquid 105 in contact with cells 101 is greater than 0.5 m/s. Further, during the stirring, liquid 105 circulates in direct contact with cells 101, and particularly with connection terminals of cells 101, which are generally the hottest portions of the cells. Further, liquid 105 has a relatively high coefficient of thermal exchange with cells 101, and particularly higher than that of air. As an example, the thermal conductivity of liquid 105 is at least three times greater than the thermal conductivity of air. For these reasons, the stirring implemented when an anomaly is detected enables to very rapidly discharge the heat generated by the faulty cell, and to distribute this heat all throughout liquid 105, as well as in the non-faulty battery cells 101. In particular, the stirring performed by device 107 enables to stop a possible thermal runaway of a cell, by maintaining or by rapidly taking the temperature of this cell below the thermal runaway point, at the cost of a slight heating of the other battery cells. As an example, when an anomaly has been detected, management device 113 may order a maintaining of the fast stirring of liquid 105 for a predefined minimum time period, for example, in the range from 10 min to 1 h, and/or until it is detected that all the battery cells 101 have returned to normal operating conditions.

In addition to the fact that it is capable of stopping a thermal runaway due to an internal failure such as a short-circuiting or an overcharge of one of its cells, the battery of FIG. 1 has the advantage that, due to the fact that its cells 101 are entirely immersed in liquid 105, the latter are not in contact with the oxygen in the air. This limits risks of cell corrosion and of interconnections between cells, and thus extends the battery lifetime. Further, this limits unwanted chemical reactions and risks of fire outbreak within the battery in the occurrence of a failure.

It should be noted that the system comprising dielectric liquid 105 and stirring device 107 is not an actual cooling system, since device 107 does not conduct liquid 105 into a heat exchanger located outside of the package to cool the liquid. Thus, in the example of FIG. 1, the heat generated by battery cells 101 is distributed into all the elements contained in package 103, but is not actively discharged outside of the package. This is however perfectly tolerable for many applications. Indeed, many batteries comprise no active cooling system and are capable, due their relatively high thermal inertia, of storing the heat that they generate for many hours without leaving the tolerated temperature ranges. The natural (passive) discharge of the heat by the walls of package 103 is then sufficient to cool the battery. As a variation, the battery according to the first embodiment may further comprise an active cooling system, as illustrated in FIG. 2 described hereafter.

Figure 2:
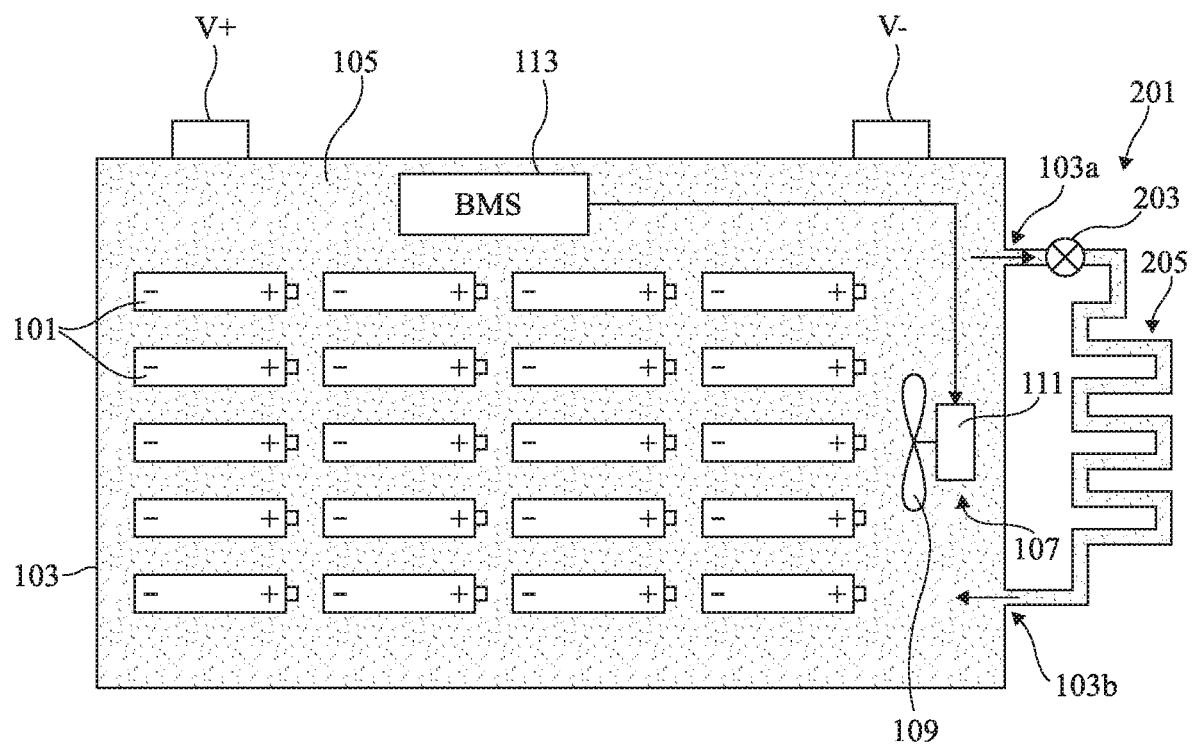
FIG. 2 is a simplified cross-section view of an alternative embodiment of the battery of FIG. 1.

FIG. 2 is a simplified cross-section view of an alternative embodiment of the battery of FIG. 1. The battery of FIG. 2 comprises the same elements as the battery of FIG. 1, arranged substantially in the same way.

The battery of FIG. 2 differs from the battery of FIG. 1 essentially in that it further comprises, outside of package 103, a circuit 201 for cooling dielectric liquid 105 contained in package 103. Cooling circuit 201 is connected to the inside of package 103 by a first opening 103a formed in package 103, defining the input of cooling circuit 201, and by a second opening 103b formed in package 103, distant from opening 103a, defining the output of the cooling circuit. Cooling circuit 201 comprises a pump 203 as well as a heat exchanger 205 coupled to a cold source (not shown). In operation, pump 203 (different from stirring device 107) sucks in the liquid 105 contained in package 103 via opening 103a, forces the circulation of the liquid sucked in through heat exchanger 205, and injects back the cooled liquid 105 into package 103 via opening 103b.

Thus, in the described embodiments, the battery comprises a heat management system comprising two different components.

The first component comprises regulation means enabling, in normal operation, to maintain the internal temperature of the battery within a predetermined nominal operating temperature range, for example, between low and high threshold values. Such regulation means may be passive or active. Passive regulation means are for example only formed by the package walls which define a surface of thermal energy exchange between the inside and the outside of the package. Active regulation means may comprise cooling circuit 201 of FIG. 2, and/or stirring device 107, and a device capable of controlling device 107 to implement a light stirring of liquid 105.

The second component of the heat management system comprises means of fast stirring of liquid 105, for example comprising stirring device 107 and a device capable of controlling device 107 to implement a fast stirring of liquid 105, to enable to rapidly distribute the thermal energy generated by a faulty cell between this cell and its neighbors. The fast stirring means are only activated when a faulty operation is detected, the regulation means being always in operation when the battery is being used.

An advantage of such a heat management system is that it can be implemented by using simple, inexpensive, low-bulk heat regulation means having a low electric power consumption, the battery security being ensured by the fast stirring means.

Figure 3:
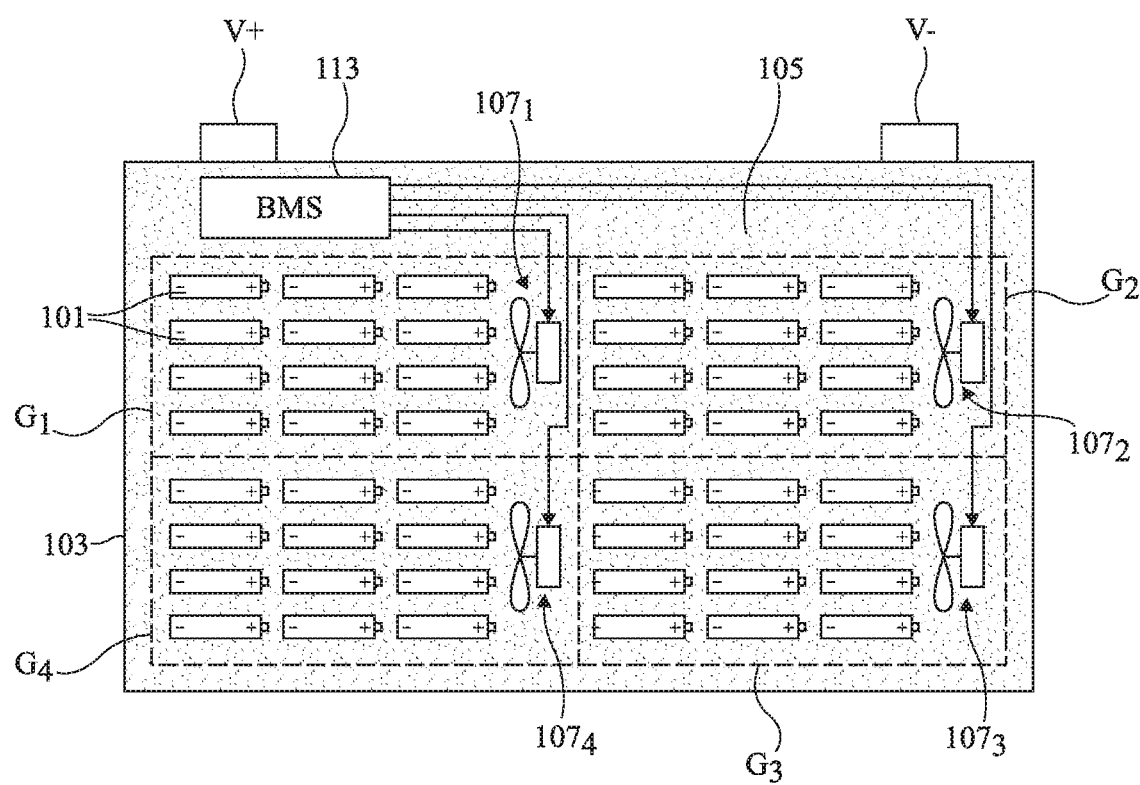
FIG. 3 is a simplified cross-section view of another alternative embodiment of the battery of FIG. 1.

FIG. 3 is a simplified cross-section view of an alternative embodiment of the battery of FIG. 1. The battery of FIG. 3 differs from the battery of FIG. 1 essentially in that it no longer comprises a single stirring device but n different ones $107_i$ distributed in package 103, n being an integer greater than 1 and i being an integer in the range from 1 to n (n=4 in the shown example). Stirring devices $107_i$ of FIG. 3 are for example identical or similar to above-described stirring device 107. Stirring devices $107_i$ are individually controllable by management device 113 to locally modify the stirring speed or power of the dielectric liquid (105).

Each stirring device $107_i$ has an associated group $G_i$ of cells 101 in the vicinity of stirring device $107_i$. As an example, cells 101 are distributed into n different groups $G_i$ respectively associated with the n stirring devices $107_i$.

The heat management system of FIG. 3 operates as follows. When management device 113 detects that a cell is faulty, it controls the stirring device $107_i$ associated with the cell group $G_i$ containing the cell to implement a fast stirring of liquid 105 in the vicinity of the cell group. The other stirring devices $107_i$ may remain off or keep on implementing a light stirring of liquid 105. In other words, the management device (113) is capable, when it detects a failure of a cell, of causing an increase of the operating power of the stirring device $107_i$ associated with the faulty cell, without necessarily increasing the operating power of the other stirring devices $107_i$.

Figure 6:
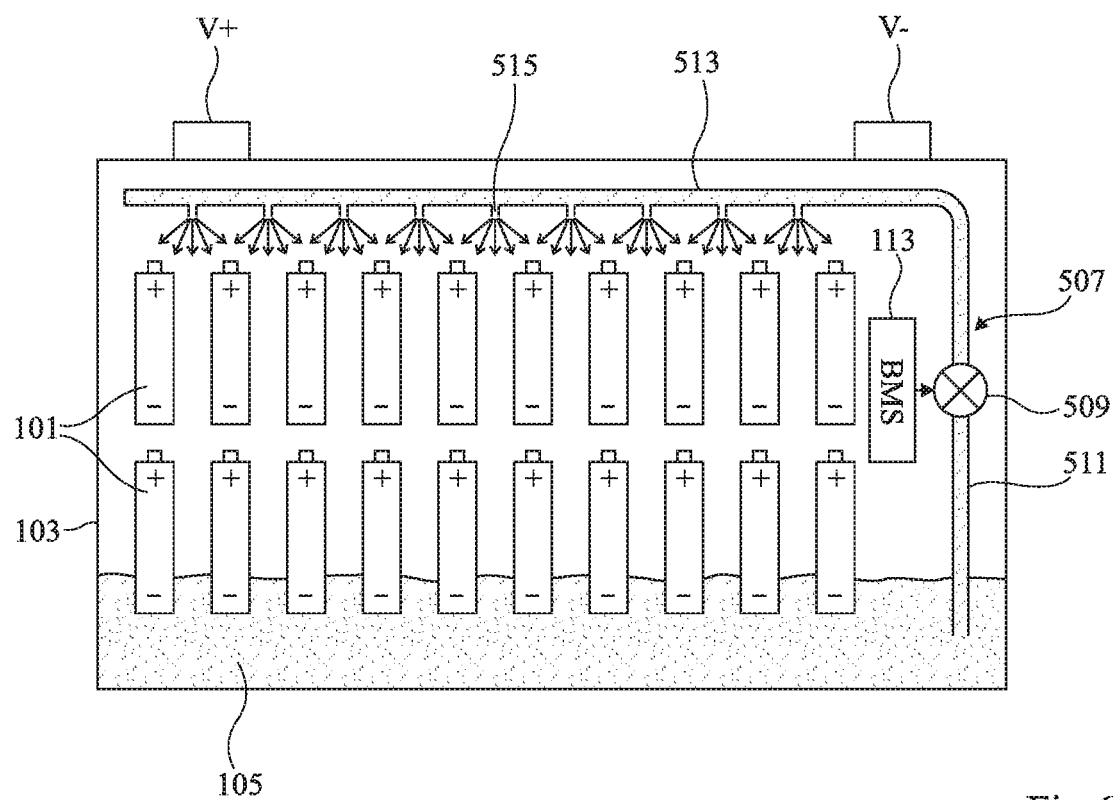
FIG. 6 is a simplified top view of another embodiment of an electric battery.

An advantage of the embodiment of FIG. 6 is that it enables, when a faulty operation is detected, to homogenize as fast as possible the temperature of liquid 105 in the immediate vicinity of the faulty cell.

As a variation, each cell may be associated with a plurality of stirring devices $107_i$, all the stirring devices associated with the cell being then activated when the cell is deemed faulty.

Of course, the arrangement of stirring devices $107_i$ may be different from what has been shown in FIG. 3. As an example, cells 101 are distributed in an array of rows and columns, and the battery comprises a stirring device $107_i$ between each row or between each column of battery cells.

It should be noted that the alternative embodiments of FIGS. 2 and 3 may be combined.

In the examples of FIGS. 1, 2, and 3, according to the nature of the selected dielectric liquid 105, the latter may have a thermal expansion coefficient of variable magnitude.

Figures 4, 5:
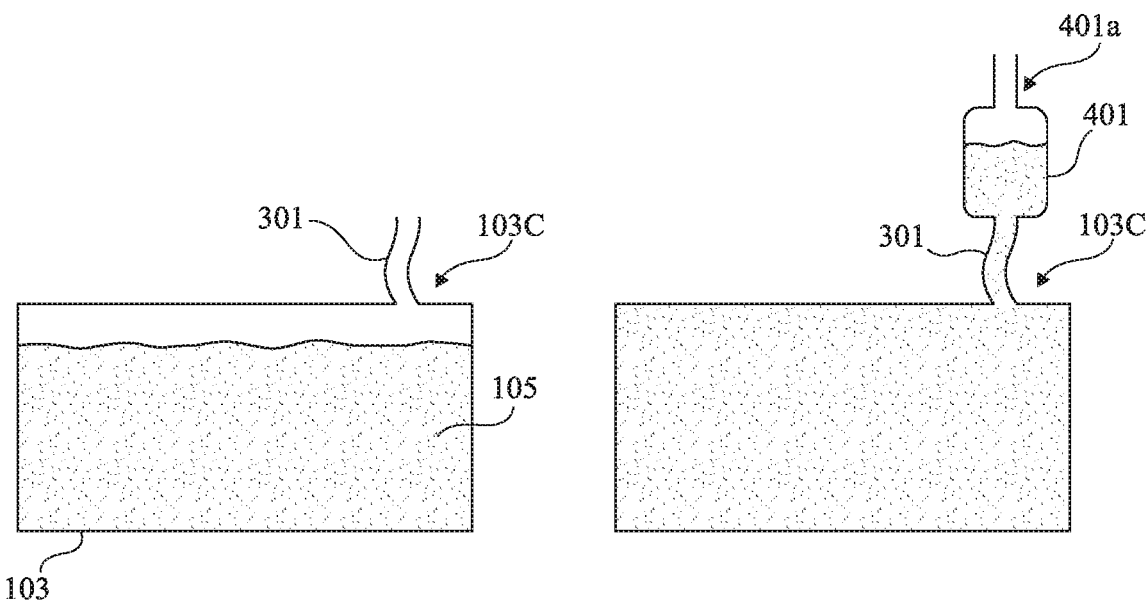
FIGS. 4 and 5 are simplified cross-section views illustrating other alternative embodiments of the batteries of FIGS. 1, 2, and 3.

FIG. 4 very schematically shows an example of a battery of the type described in relation with FIGS. 1, 2, and 3. For simplification, only package 103 and dielectric liquid 105 have been shown in FIG. 4. As illustrated in FIG. 4, package 103 may comprises, on its upper surface (when the battery is in a normal operating position), an opening 103c connected to the outer atmosphere by a duct 301, enabling the pressure within the package to be always substantially equal to the atmospheric pressure. This especially enables to balance the stress due to the expansion/contraction of the oil and to the volume variation of the package during battery heating and cooling phases. In the example of FIG. 4, package 103 is not totally filled with dielectric liquid 105. An upper portion of package 103 is left free of liquid 105 to be able to absorb the expansion of liquid 105 during battery heating phases, with no risk for liquid 105 to overflow outside of the battery via opening 103c and duct 301.

FIG. 5 very schematically shows another example of a battery of the type described in relation with FIGS. 1, 2, and 3. For simplification, only package 103 and dielectric liquid 105 have been shown in FIG. 5. As in the example of FIG. 4, package 103 comprises an opening 103c connected to a duct 301. However, in the example of FIG. 5, duct 301 does not emerge into free air, but into a tank 401 containing a reserve of liquid 105. In this example, tank 401 of the battery is used as an expansion chamber. As an example, tank 401 is partially filled with liquid 105 and comprises, in an upper portion, a vent 401a enabling to balance the pressure within the tank. As a variation, tank 401 comprise a first chamber filled with liquid 105, having duct 301 emerging into it, and a second chamber filled with air or with another gas separated from the first chamber by a resilient membrane. In the example of FIG. 5, package 103 may be totally filled with liquid 105.

FIG. 6 is a cross-section view schematically illustrating an example of an electric battery according to a second embodiment.

The battery of FIG. 6 comprises many elements and operating modes common with the batteries described in relation with FIGS. 1, 2, 3, 4, and 5. Such elements and operating modes will not be described again in detail hereafter. Hereafter, only the differences with the first embodiment will be highlighted.

The battery of FIG. 6 differs from the batteries described in relation with FIGS. 1, 2, 3, 4, and 5 mainly by the fact that, in the embodiment of FIG. 6, in normal operation, elementary battery cells 101 are not or not totally immersed into dielectric liquid 105. As an example, only a lower portion of package 103 is filled with dielectric liquid 105, for example, up to a height smaller than one third of the height of package 103.

In the battery of FIG. 6, stirring device 107 described in relation with FIG. 1 is replaced with a stirring device 507 capable of pumping dielectric liquid 105 from the bottom of package 103, and of projecting the liquid 105 sampled from the bottom of the package onto battery cells 101, and particularly onto the cell connection terminals. In the shown example, stirring device 507 comprises a pump 509 having an input connected to liquid reserve 105 located at the bottom of package 103 by an intake duct 511, and having an outlet connected to an outlet duct 513 provided with spray nozzles 515. In the shown example, outlet duct 513 is located in an upper portion of package 103, above cells 101, spray nozzles 515 facing cells 101. Other arrangements of stirring device 507 may of course be provided.

When stirring device 507 is in operation, the liquid 105 sampled from the bottom of package 103 is sprayed on battery cells 101, and then falls by gravity into the lower portion of package 103, where it is sucked back in by pump 509. The circulation of liquid 105 thus obtained enables to rapidly homogenize the temperature of the battery cells.

As in the first embodiment, stirring device 507 is controllable by battery management device 113, and management device 113 is capable of causing an increase in the stirring power when a faulty operation capable of resulting in a thermal runaway or of resulting from a thermal runaway is detected.

An advantage of the embodiment of FIG. 6 over the embodiment described in relation with FIGS. 1, 2, 3, 4, and 5 is that the quantity of liquid 105 inside of the battery is small, which enables to limit the battery weight.

It should be noted that similarly to what has been described in relation with FIG. 2, the battery of FIG. 6 may further comprise, outside of package 103, a circuit for cooling the dielectric liquid 105 contained in package 103.

Specific embodiments have been described. Various alterations, modifications, and improvements will occur to those skilled in the art. In particular, the above-described batteries may be equipped with a controllable device for heating dielectric liquid 105, for example, by means of a heating resistor. An advantage then is that liquid 105 may be used to maintain the battery temperature while the battery is used in cold environments. Stirring device 107 or 507 may in particular be actuated during the heating to provide a homogeneous and fast heating of the battery.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electric battery comprising:
    a plurality of electrical energy storage cells each comprising a positive terminal and a negative terminal, the cells being arranged in a package containing a dielectric liquid;
    heat regulation means capable, in normal operation, of maintaining the dielectric liquid within a predetermined temperature range;
    within the package, a plurality of stirring devices individually controllable for circulating the dielectric liquid in contact with the positive and negative terminals of the cells; and
    a management device capable of detecting a possible failure of a cell of the plurality of electrical energy storage cells and, when the cell failure is detected, of controlling the plurality of stirring devices to locally modify the power of the dielectric liquid stirring in the package,
    wherein the plurality of energy storage cells are distributed into aa plurality of different groups, each of the plurality of different groups being associated with a specific stirring device of the plurality of stirring device, wherein the management device is capable, when it detects the possible failure of the cell, of controlling a stirring device of the plurality of stirring devices associated with a group of the plurality of different groups comprising the cell to cause an increase of the operating power of the stirring device without increasing the operating power of other stirring devices of the plurality of stirring devices.

2. The battery of claim 1, wherein the cells are totally immersed in the dielectric liquid.

3. The battery of claim 2, wherein each stirring device comprises a propeller immersed in the dielectric liquid, coupled to a driving motor.

4. The battery of claim 1, wherein the cells are not totally immersed in the dielectric liquid.

5. The battery of claim 4, wherein each stirring device is capable of sucking the dielectric liquid into a lower portion of the package, and of spraying the sucked-in liquid onto the cells.

6. The battery of claim 1, wherein the plurality of stirring devices are not coupled to a heat exchanger external to the package.

7. The battery of claim 1, further comprising a cooling circuit comprising a heat exchanger located outside of the package.

8. The battery of claim 7, wherein the cooling circuit comprises a pump separate from the plurality of stirring devices capable of circulating the dielectric liquid in the heat exchanger.

9. The battery of claim 1, wherein the dielectric liquid is a dielectric oil or a dielectric ester.

10. The battery of claim 1, further comprising a device for maintaining the internal pressure of the package at a value substantially equal to the outer pressure.

11. The battery of claim 1, further comprising a controllable device for heating the dielectric liquid.

* * * * *